United States Patent [19]
Hauser

[11] Patent Number: 5,226,854
[45] Date of Patent: Jul. 13, 1993

[54] TRANSMISSION SYSTEM

[76] Inventor: Richard J. Hauser, 7 Mead Ter., Glen Ridge, N.J. 07028

[21] Appl. No.: 841,011

[22] Filed: Feb. 25, 1992

[51] Int. Cl.$^5$ .............................................. F16H 9/00
[52] U.S. Cl. ...................................................... 474/83
[58] Field of Search ....................... 474/49, 83; 74/191, 74/192

[56] References Cited

U.S. PATENT DOCUMENTS

| | | | |
|---|---|---|---|
| 944,585 | 12/1909 | Watson | 474/83 |
| 1,048,220 | 12/1912 | Sleeper | 474/83 X |
| 2,705,892 | 4/1955 | Yeager | 474/83 X |
| 3,906,809 | 9/1975 | Erickson | 74/192 X |
| 4,842,569 | 6/1989 | Orr | 474/83 |

FOREIGN PATENT DOCUMENTS

| | | | |
|---|---|---|---|
| 449764 | 7/1948 | Canada | 474/83 |
| 153265 | 5/1932 | Fed. Rep. of Germany | 474/83 |
| 179530 | 9/1935 | Fed. Rep. of Germany | 474/83 |
| 409584 | 4/1910 | France | 474/83 |
| 298668 | 7/1932 | Italy | 474/83 |
| 450541 | 7/1949 | Italy | 74/192 |

Primary Examiner—Ramon S. Britts
Assistant Examiner—Roger J. Schoeppel
Attorney, Agent, or Firm—Alfred C. Hill

[57] ABSTRACT

A continuously variable transmission having first and second rotating conical members; oriented to have parallel longitudinal axis with the smaller diameter end of one adjacent the larger diameter end of the other; a plurality of longitudinal channels disposed in the surface of each conical member; a first device encircling both of the first and second members; a second device disposed in each of the plurality of channels adjacent the first device capable of gripping the first device to transmit rotation of one of the first and second members to the other of the first and second members; a third device disposed adjacent both of the first and second members to control the time when each device grips to effect transmission of the rotation; fourth means coupled to one of the first and second members acting as a drive member to change the longitudinal location of the second device in the plurality of channels of the drive member; and fifth means coupled to the other of the first and second members acting as a driven member and to the second device of the drive and driven members to change the longitudinal location of the second device in the plurality of channels of the driven member to an appropriate longitudinal position relative to the longitudinal position of the first device on the drive member.

20 Claims, 3 Drawing Sheets

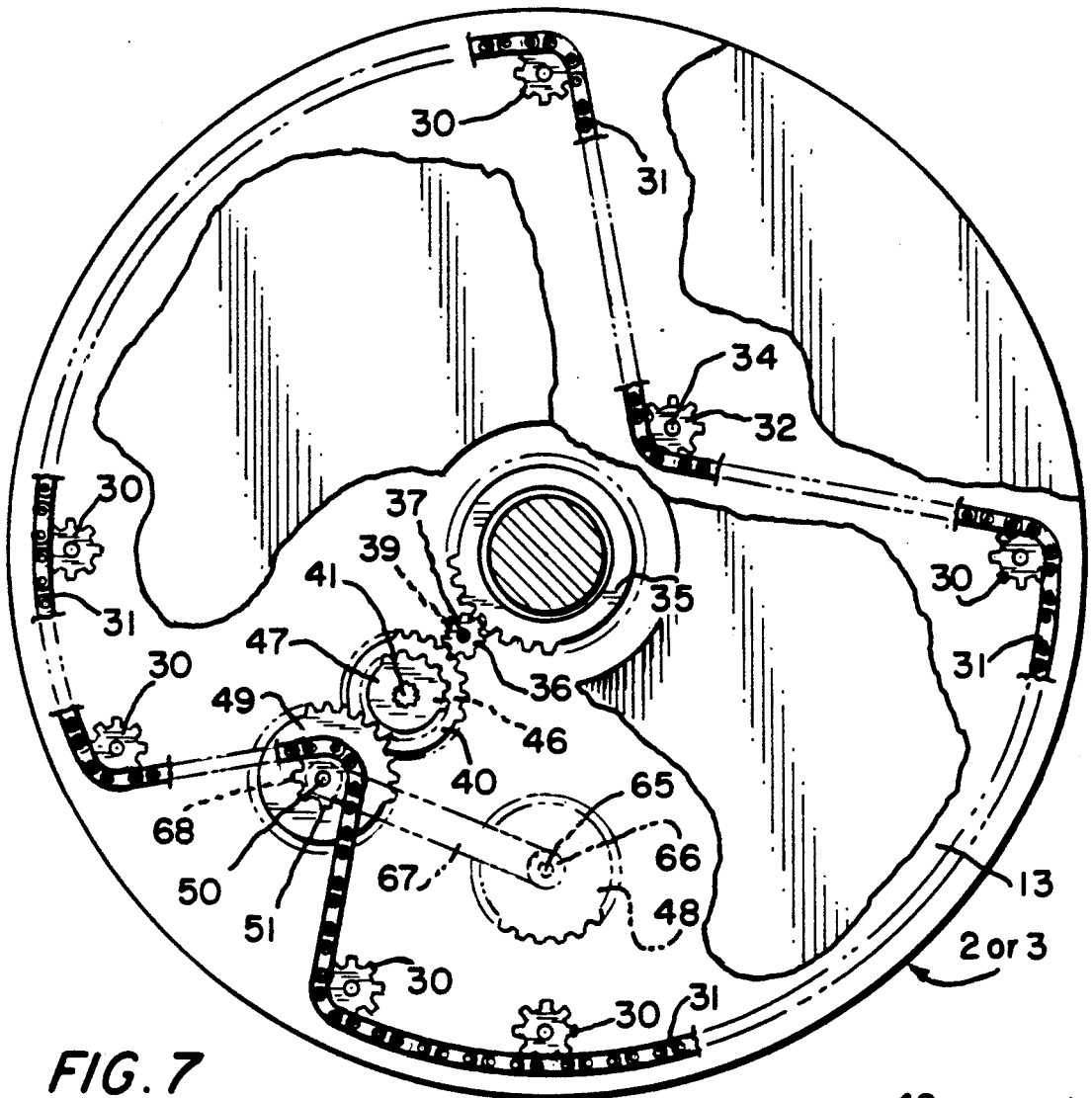

TRANSMISSION SYSTEM

BACKGROUND OF THE INVENTION

The present invention relates to transmission systems and more particularly to a continuously variable transmission system.

Most mechanical power sources operate most efficiently if tailored to operate in narrow speed ranges. For example, a gasoline engine typically runs between 1,000 and 5,000 RPM (revolutions per minute) and only operates at peak efficiency in a much narrower band. To power an motor vehicle this must be translated into a wheel speed ranging from 0 to 1,000 RPM (high limit depends on wheel size and top speed). There are at present three ways this is commercially accomplished. The first is a "manual" transmission which has now up to 7 speed ranges, with which to divide the overall range into and a clutch to shift between the ranges. The second type is an "automatic" transmission which has up to 3 ranges like a "manual" transmission plus a hydrokinetic clutch which helps it between ranges. The third type is called a "ECVT" transmission standing for electrically controlled variable transmission. This is an option for only one motor vehicle, the Subaru Justy. The ECVT transmission is a modification of an arrangement of two coaxial cones with the small diameters thereof facing one another.

The employment of cones in transmission systems is well known as evidenced by the following U.S. Pat. Nos. 657,855; 1,048,220; 1,256,418; 1,358,447; 2,705,892; 3,021,717; 3,257,857; 3,894,439 and 3,906,809.

The prior art use of cones in a transmission system have cones that are very short for their width and a V-belt that rides between them. The tension on the belt causes the belt to act or be acted upon by the cones through friction. By pressing the cones together the belt is caused to slide outward away from the axis of rotation. This is a workable system as evidenced by the fact that it is used in a moped sold by Motobecane. The problem with this design is that the belt is overworked tensionally and frictionally. To provide driving force the belt must be in tension which is added to the tension that the belt must sustain due to driving forces. Frictionally, the belt must be sticky enough for the cones to grip to provide driving force, yet must still be able to slide to change gearing ratios.

A modification of the above prior art arrangement was to replace the V-belt with a large number of trapezoidal (the true cross-section of a V-belt) metal plates with a cord running through their centers. The frictional contact is now metal to metal, and the driving force is now the plates pushing on one another. This in effect separates the two jobs the belt had to accomplish, that of tension and that of driving force. This type of transmission system has been viewed favorably except that it is only offered as an option with small engines and without four-wheel drive. One of the problems with this type of transmission system is handling high torque applications.

An answer to the above problems is to eliminate the need for belt tension to provide frictional driving force and eliminate the need for the two pieces that hold onto one another to also be able to slide against one another. If this is achieved then high torque applications will be possible because frictional pressures can be increased. Whatever the precise merits, features and advantages of the above cited prior art, none of them achieves or fulfills the smooth change of ratios under high torque, without the excessive loss of energy which the invention of the present application overcomes.

SUMMARY OF THE INVENTION

The basic idea of the present invention is to alter the idea that power transmission must take place over a mechanically linked junction, such as gear to gear interfaces or cog to chain interfaces. The reasoning is that a positive interface limits the smooth changing of gear ratios, "shifting gears". This is usually accomplished with either rolling friction or V-belts.

Rolling friction is like a ball put on a spinning record. The ball rolls slowly near the center and faster at the edges. This system relys on a point contact between the ball (a sphere) and the record (a plane). The size of the contact patch dictates a very high pressure necessary for reasonable torque levels, and therefore has problems.

V-belts riding in the V formed between two coaxial cones facing one another is another approach. The belt is stretched tight and this allows the cones to grip the sides of the belt. By varying the distance between the cones, the belt rides at varying distances from the axis' of the cones. This is a workable system for low torque applications, but suffers at higher torques because the belt is too highly stressed. The belt must transfer the torque plus provide the tension which provides the side gripping force. This force is high and inversely related to the friction of the side of the belt, which means rubber must be used. The system is workable but has wear problems.

General Motors has solved some of the problems by using a system of stack plates on a Kevlar belt in place of a rubber V-belt. This is presently called ECVT and appears in Subaru Justy's with the 36 HP (horse power) motor and no 4 WD (wheel drive). This arrangement is suspect since is appears to have problems handling high torque, but it proves there is a market.

The present invention is related to the V-belt type, but solves the problems thereof. First, the twin cones are replaced with a single cone with shallower side angles. Instead of changing the distance between the cones, just slide the belts to the larger or smaller end. To increase range, have the belt travel between two such cones with reversed orientation. The belt travels in a plane perpendicular to the cones axis' which are parallel to one another.

To alleviate the problem of overworking the belt, the belt does not have to be tensioned to provide frictional driving force. The belts of the present invention is not a trapezoidal cross section (like a V-belt), rather it will have an inverted "house" cross-section. The angled roof sides will ride on the cones, but are not relied on for tractive force. Pairs of jaws set in longitudinal slots in the cones will grip the sides of the belt. This will only occur on the outer third of the cones respective rotations. The timing of this will be provided by rotating "cam lifters" attached at the ends of threaded rods which the jaws ride on. The "cam lifters" then ride on a stationary cam surface at each end of the cones. To change ratios, the threaded rods which the jaws ride on will be rotated as follows: the rods controlling jaws not in contact with the belt will be rotated as a group prior to rotation of rods controlling the jaws gripping the belt. The jaws and the belt will then be adjusted to the required ratio.

Since the pressure exerted on the belt of the present application can be dictated by the designer without having to worry about snapping the belt, the pressures could be increased significantly for increased torque carrying capacity. There would always be one pair of jaws gripping the belt on each cone at any time. If there were 4 sets of jaws set every 90 degrees around the cones, and the jaws grip the belt for 120 degrees, the next set of jaws would grip the belt when there was no relative motion between these two sets of jaws.

Therefore, it is an object of the present invention to provide a continuously variable transmission system that enables varying output gearing ratios infinitely and continuously across the design range of the transmission system.

Another object of the present invention is to provide a continuously variable transmission system which operates using static, non-point contact friction as a driving force.

Still another object of the present invention is to provide a continuously variable transmission system that does not need to allow for slip on its' frictional drive surfaces since the contact areas will not move in reference to one another for the duration of their contact.

A further object of the present invention is to provide a continuously variable transmission system that can be built into the confines of an automotive transmission area and sustain loads standard to present automotive engine design.

Still a further object of the present invention is to provide a continuously variable transmission system that can vary its output gearing ratio while turning and sustaining torque loads.

A feature of the present invention is the provision of a transmission system comprising a first rotating conical member; a second rotating conical member, the second member being oriented with respect to the first member to have its longitudinal axis parallel to the longitudinal axis of the first member, to have its small diameter end adjacent the larger diameter end of the first member and to have its larger diameter end adjacent the smaller diameter end of the first member; a plurality of predeterminedly spaced longitudinal channels disposed in the surface of each of the first and second members; first means encircling both of the first and second members; second means disposed in each of the plurality of channels of each of the first and second members adjacent the first means capable of gripping the first means to transmit rotation of one of the first and second members to the other of the first and second members; and third means disposed adjacent each end of both of the first and second members and coupled individually to each of the second means to control in a predetermined manner the time when each of the second means grips the first means to effect transmission of the rotation.

Another feature of the present invention is the provision of a continuously variable transmission system comprising a first rotating conical member; a second rotating conical member, the second member being oriented with respect to the first member to have its longitudinal axis parallel to the longitudinal axis of the first member, to have its smaller diameter end adjacent the larger diameter end of the first member and to have its larger diameter end adjacent the smaller diameter end of the first member; a plurality of predeterminedly spaced longitudinal channels disposed in the surface of each of the first and second members; first means encircling both of the first and second members; second means disposed in each of the plurality of channels adjacent the first means capable of gripping the first means to transmit rotation of one of the first and second members to the other of the first and second members; third means disposed adjacent each end of both of the first and second members and coupled individually to each of the second means to control in a predetermined manner the time when each of the second means grips the first means to effect transmission of rotation; fourth means coupled to one of the first and second members acting as a drive member to change the longitudinal location of the second means in the plurality of channels of the drive member and, hence the longitudinal location of the first means on the surface of the drive member; and fifth means coupled to the other of the first and second members acting as a driven member and to the second means of the drive and driven members to change the longitudinal location of the second means in the plurality of channels of the driven member and, hence, the longitudinal location of the first means on the surface of the driven member to an appropriate longitudinal position relative to the longitudinal position of the first means on the drive member; the fourth and fifth means enabling the achievement of a continuously variable transmission system.

A further feature of the present invention is the provision in a transmission system of a selected one of a drive member and a driven member comprising a rotating conical member; a plurality of predeterminedly spaced longitudinal channels disposed in the surface of the member; first means adjacent the surface of the member in a predetermined circumferential relationship therewith; second means disposed in each of the plurality of channels adjacent the first means capable of gripping the first means to transmit a selected one of a drive force and/or a driven force; and third means disposed adjacent each end of the member and coupled to the second means to control in a predetermined manner the time when each of the second means grips the first means.

BRIEF DESCRIPTION OF THE DRAWING

Above-mentioned and other features and objects of the present invention will become more apparent by reference to the following description taken in conjunction with the accompanying drawing, in which:

FIG. 7 is an end view of the large diameter end of the conical members of FIG. 1 showing the gearing arrangement to rotate the threaded control rods employed in the embodiment of FIG. 1;

FIG. 9 is a perspective view showing in greater detail the gear arrangement shown in FIGS. 1 and 7.

DESCRIPTION OF THE PREFERRED EMBODIMENTS

Figure 1:
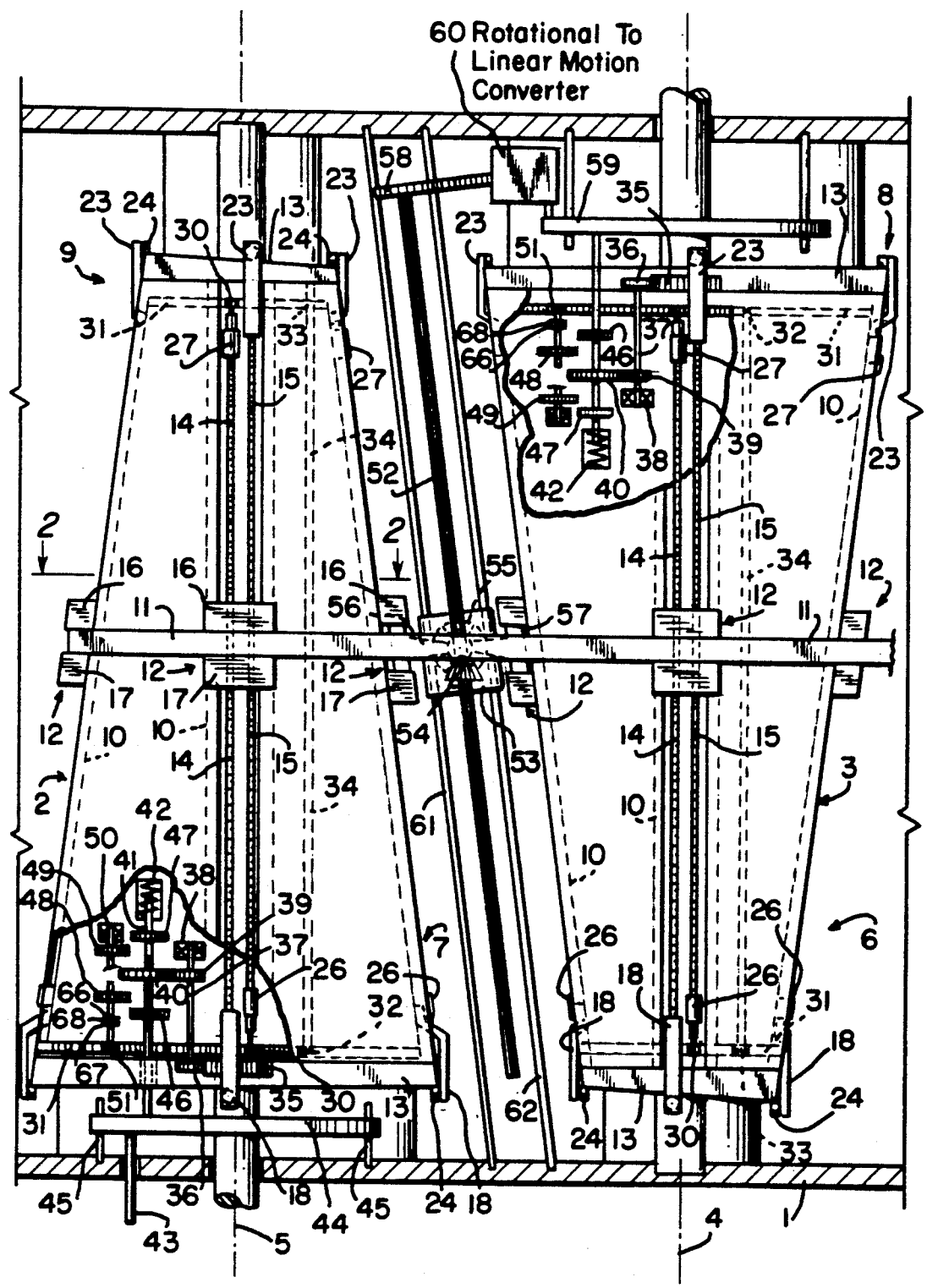
FIG. 1 is a plan view of one embodiment of a transmission system in accordance with the principles of the present invention with the cover thereof cut away.
Figure 2:
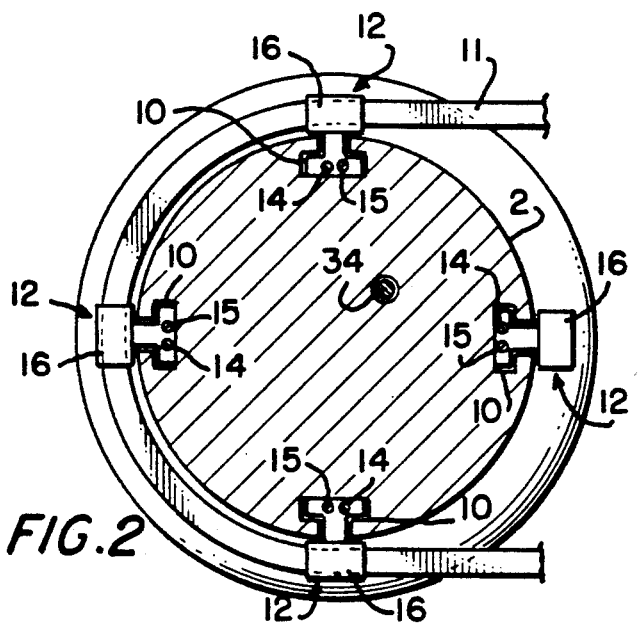
FIG. 2 is a cross-sectional view taken along line 2—2 of FIG. 1.

Referring to FIG. 1, a plan view of one embodiment of the transmission system is illustrated with the housing or cover 1 thereof cut away to expose the main components of the transmission system in accordance with the principles of the present invention. FIGS. 2 through 9 show in detail various components of the transmission system of FIG. 1.

The transmission system in accordance with the principles of the present invention includes a first rotating conical member 2 and a second conical member 3 with the second rotating conical member 3 being oriented with respect to the first conical member 2 to have its longitudinal axis 4 parallel to the longitudinal axis 5 of the first conical member 2, to have its smaller diameter end 6 adjacent the larger diameter end 7 of the first conical member 2 and to have its larger diameter end 8 adjacent the smaller diameter end 9 of the first conical member 2.

A plurality of predeterminedly spaced longitudinal channels 10 are formed in the surface of each of the first and second members 2 and 3. The longitudinal channels 10 are shown in greater detail in FIG. 2 and are formed to be T-shaped channels and in the embodiment illustrated are spaced 90 degrees from each other around the circumference of each of the conical members. A first means, such as belt 11, or some other type of endless transmission member, such as a chain, encircle both of the conical members 2 and 3 and has a cross-section like a roofed house as specifically shown in FIG. 3. A second means in the form of a pair of jaws 12 are disposed in each of the channels 10 of each of the members 2 and 3 adjacent the belt 11 capable of gripping belt 11 to transmit rotation of one of the first and second members 2 and 3 to the other of the first and second members 2 and 3. In the illustration shown member 2 is the drive member so that the pair of jaws 12 grips the belt 11 to transmit rotation of drive member 2 to the driven member 3 by the pair of jaws 12 of member 3 gripping the belt 11 to thereby cause rotation of driven member 3.

A third means in the form of cam surfaces 13 disposed adjacent each end of both of the members 2 and 3 with the cam surfaces being individually coupled to each of the pair of jaws 12 to control in a predetermined manner the time when each of the pair of jaws 12 grip the belt 11 to effect transmission of the rotation of drive member 2 to the driven member 3.

Figure 4:
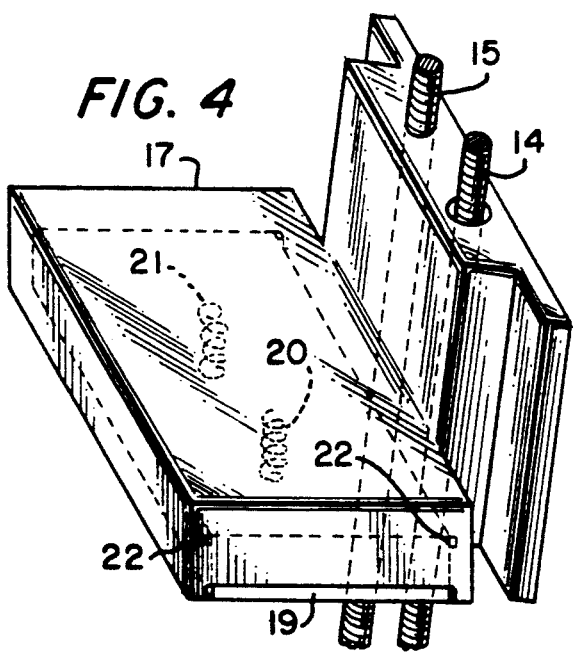
FIG. 4 is a perspective view showing in greater detail one of the jaws of each of the pairs of jaws employed in the embodiment of FIG. 1.
Figure 5:
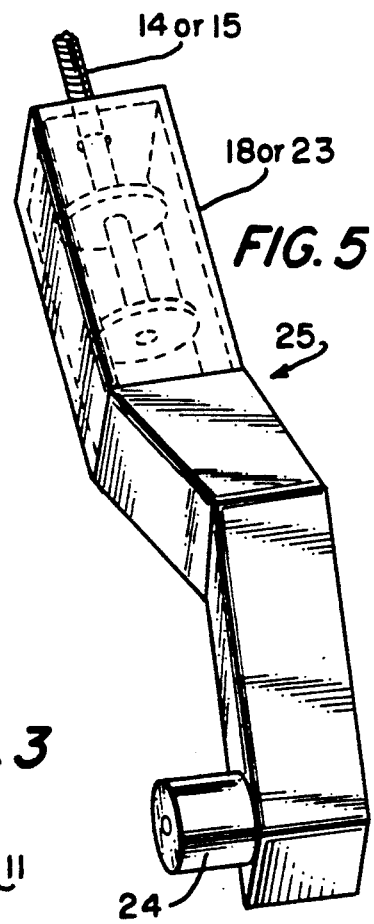
FIG. 5 is a perspective view showing in greater detail the lifters employed in the embodiment of FIG. 1.
Figure 8:
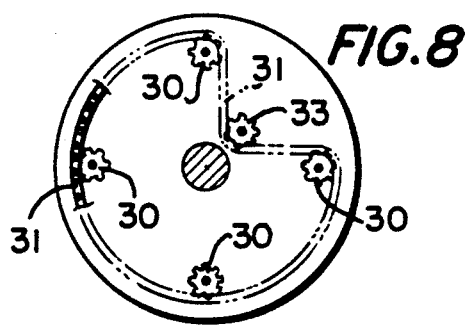
FIG. 8 is an end view of the smaller diameter end of the conical members of FIG. 1 illustrating how rods associated with the smaller diameter end of the conical members are rotated in response to the rotation of the rods associated with the larger diameter end of the cones shown in the embodiment of FIG. 1.
Figure 3:
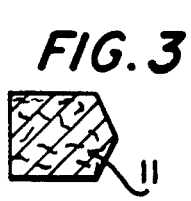
FIG. 3 is a cross-sectional view of the belt-like or endless transmission member of FIGS. 1 and 2.

FIG. 4 illustrates in detail one of the jaws 16 and 17 of the pair of jaws 12. Each of the pairs of jaws 12 are controlled by control rods 14 and 15. Rods 14 and 15 are threaded throughout their length. Rod 14 is threaded to the upper jaw 16 and passes in an unthreaded relationship through the lower jaw 17 of the pair of jaws 12 to a lifter 18 as illustrated in FIG. 4, the details of which is illustrated in FIG. 5.

Each of the jaws of the pair of jaws 12 have a T-shaped configuration at the base thereof to fit into T-shaped groove 10 and to be held therein for only longitudinal movement of each of the jaws. The friction pads 19 are held on four sides only allowing motion in two directions, in and out. Pads 19 are constantly pushed outward by springs 20 and 21 and are prevented from falling out by end stops 22. Friction pad 19 of each of the pair of jaws 12 grip the belt 11 or other endless transmission means when the cam surfaces 13 dictate that the pair of jaws 12 should grip the belt 11.

Rod 15 is rotationally fastened to lifter 23 identical to lifter 18. Rod 15 extends in an unthreaded relation through the upper jaw 16 into a threaded engagement with lower jaw 17. Each of the lifters 18 or 23 hold rollers 24 which roll on and follow the contour of the appropriate one of cam surfaces 13. Lifters 18 or 23 are attached to the control rod 14 or 15, respectively, by a rotational joint 25. This is a connection that allows rotational movement but not linear movement. One example of a rotational joint is a double acting thrust bearing.

Figure 6:
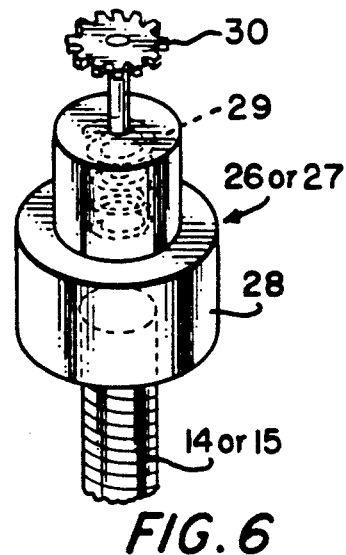
FIG. 6 is a perspective view showing in greater detail the controller attached to the threaded rods in the embodiment of FIG. 1.

A controller 26 is fastened to the other end of rod 15 and a controller 27 is fastened to the other end of rod 14 so that rods 15 and 14 can be rotated to thereby change the longitudinal position of the pair of jaws 12. As shown in FIG. 6 controllers 26 and 27 are attached to control rods 14 and 15, respectively, by a linear joint 28 which is the type of joint that allows linear movement but not rotational movement. Linear joint 28 is linked by a spring 29 to a sprocket 30. Spring 29 is important because the pair of jaws 12 cannot be moved while they cause the friction pads 19 to grip belt 11. This is because if two pairs of jaws 12 were gripping belt 11 and they moved belt 11 would either break or slack. Spring 29 will move control rods 14 and 15 and, thus, the pair of jaws 12 only when there is no pressure (no jaws gripping belt 11). When there is pressure, control rods 14 and 15 will not turn because they are threaded in the jaw. This will cause spring 29 to coil up to store this impulse or desire to turn. When the pressure is released spring 29 will uncoil to cause rotation of the control rods 14 and 15. The sprockets 30 of the controllers 28 are interconnected by chains 31, one at each end of each of members 2 and 3.

The chains 31 of each of members 2 and 3 are linked together by sprockets 32 and 33 connected at opposite ends of rod 34 so that the overall speed and direction of rotation of all the sprockets 30 and through springs 29 and linear joints 28 rods and 14 and 15 will be the same. The sprockets 30 and 33 and chain 31 are shown in greater detail in FIG. 7 and the sprockets 30 and 32 and the chain 31 are shown in greater detail in FIG. 8.

With the parts discussed so far, all that is needed to change gear ratio is to move chains 31 to rotate rods 15 and 14 and rod 34 to thereby move jaws 12 and, hence, belt 11 longitudinally along the surface of members 2 or 3. The direction of movement will dictate the type of change, increase or decrease, of gear ratio.

To change the gear ratios a stationary gear 35 is formed on the large cam plate containing cam surface 13 of each of the members 2 and 3. Note FIGS. 1, 7 and 9 for the details thereof. A gear 36 mounted on members 2 and 3 will engage gear 35 and rotate there around upon rotation of the members 2 and 3. Gear 36 is secured to a shaft 37 which can rotate in a bearing 38 secured to members 2 and 3. A series of gears follow to gear the motion of gear 36 down to a suitable speed including gear 39 mounted on shaft 37 and gear 40 splined on shaft 41. Shaft 41 is spring loaded by spring 42 so that shaft 41 is pushed in the upward direction in the arrangement associated with member 3 and in a downward direction in the arrangement associated with member 2. The arrangement that follows and the manner of operating thereof will cause the chains 31 to be moved in one direction for increasing the gear ratio and the other direction for decreasing the gear ratio. The shifting arrangement will include a shifter 43. Shifter 43 rests upon a circular member 44 which is guided for only in and out movement by members 45 and is in circular form so that member 44 can be maintained in contact with shaft 41 regardless of the position of member 2. Gear 40 is splined to shaft 41 to allow shaft 41 to slide inside gear 40. Shaft 41 has two other gears 46 and 47 in fixed position along its length. Shaft 41 itself will be pushed out of member 2 or 3 by a spring 42 to force it to come in contact with circular member 44. Circular member 44 under control of shifter 43 will control which of three positions the arrangement can assume, neutral, gear ratio increase or gear ratio decrease. Neutral is the position shown in the drawing where neither of the gears 46 and 47 contact another gear. When shaft 41 is allowed to move under control of the expansion of spring 42, gear 47 engages gear 49 on shaft 50. Shaft 50 carries a sprocket 51 which engages chain 31. Clockwise rotation of member 2 in FIG. 7 causes shaft 37 to rotate clockwise which causes shaft 41 to rotate counterclockwise. Thus, when gear 47 engages gear 49 shaft 50 and, hence, sprocket 51 will be rotated clockwise causing chain 31 to move counterclockwise. This will rotate rods 14 and 15 counterclockwise thereby moving jaws 12 lower on member 2 toward larger diameter end 7, assuming a right hand thread on rods 14 and 15.

When shaft 41 is moved against spring 42, gear 46 engages gear 48 which is fastened to shaft 65 carrying a sprocket 66 under gear 48 as shown in FIG. 7. Sprocket 66 engages a chain 67 driving a sprocket 68 secured to shaft 50 under gear 49 as shown in FIG. 7. This causes sprocket 51 to rotate counterclockwise and, hence, move chain 31 in a clockwise direction causing rods 14 and 15 to rotate in a clockwise direction thereby moving jaws 12 higher on member 2 towards the smaller diameter end 9.

The gearing arrangement just described with respect to drive member 2 is identical in the driven member 3 with the exception that its gearing arrangement responds to longitudinal positioning of the pair of jaws 12 in drive member 2 rather than a member similar to shifter 43.

As described hereinabove movement of chain 31 causes a complimentary rotation of rod 34 to drive chain 31 at the smaller diameter end of cone 2 or 3 to thereby provide a complimentary rotation of the control rods 14 and 15 associated with each one of the pair of jaws 12. Obviously, this is only one of a thousand ways this same shifting could be accomplished.

The same setup as mentioned above is duplicated for both members 2 and 3, but there is a problem. The shifting mechanism is rotational speed dependent and members 2 and 3 rotate at different speeds. This means that whatever is controlling the transmission can only directly control the drive member 2. Driven member 3 must be reactively controlled. This means that there must be provided a mechanism that senses the linear position of the pair of jaws 12 on the drive member 2 to enable adjustment of the jaws 12 on the driven member 3 to match the longitudinal position of the jaws 12 of drive member 2 and the longitudinal position of jaws 12 on driven member 3. In one embodiment shown in FIG. 1 this is accomplished by running a splined shaft 52 between members 2 and 3. On the shaft rides an assembly 53 which is relatively free to move up and down the length of shaft 52. Shaft 52 is connected to a beveled gear 54 in assembly 53. Beveled gear 54 is engaged with another bevel gear 55 which is attached to a pivoting arm 56. Arm 56 extends out and rides between opened pairs of jaws 12 on drive member 2. On the other side of assembly 53 is a fixed pod 57 that rides between the open jaws of the pairs of jaws 12 of driven member 3. Pod 57 keeps the assembly 53 even with the jaw position along the surface of driven member 3. If drive member 2 jaws 12 move, then arm 56 will move, rotating bevel gear 55 and, hence, bevel gear 54 to rotate shaft 52 which in effect orders driven member 3 to correct the position of its pairs of jaws 12. This is accomplished by the gear 58 whose rotation is converted from a rotational motion to a linear motion to operate upon circular member 59 to thereby control the position of shaft 41 and, hence, the rotation of rods 14 and 15 to control the longitudinal position of the pairs of jaws 12 and, hence, the longitudinal position of belt 11 on a driven member 3. Circular member 59 is similar to circular member 44, but is actuated by the rotational to linear motion converter 60 rather than an arrangement similar to shifter 43. Converter 60 may be a worm gear arrangement which converts rotational motion to linear motion to thereby act upon circular member 59 and, hence, shaft 41 of the driven member 3.

The importance of the relatively free motion of assembly 53 is that its position is only given by four sets of jaws. There will be gaps in the supported times of mechanism 53. Assembly 53 should not be so free that it could either move on its own or be moved by the motion of the pivoting arm 56. To prevent this rods 61 and 62 are provided to prevent the assembly from rotating around the splined shaft 52.

While I have described above the principles of my invention in connection with specific apparatus, it is to be clearly understood that this description is made only by way of example and not as a limitation of the scope of my invention as set forth in the objects thereof and in the accompanying claims.

I claim:

1. A transmission system comprising:
   a first conical member capable of rotation only;
   a second conical member capable of rotation only, said second member being oriented with respect to said first member to have its longitudinal axis parallel to the longitudinal axis of said first member, to have its smaller diameter end adjacent the larger diameter end of said first member and to have its larger diameter end adjacent the smaller diameter end of said first member;
   a plurality of predeterminedly spaced longitudinal channels disposed in the surface of each of said first and second members;
   first means encircling and in common to both of said first and second members;
   second means disposed in each of said plurality of channels of each of said first and second members adjacent said first means capable of gripping said first means to transmit rotation of one of said first and second members to the other of said first and second members; and
   third means disposed adjacent each end of both of said first and second members and coupled individually to each of said second means to control in a predetermined manner the time when each of said second means grips said first means to effect transmission of said rotation.

2. A system according to claim 1, wherein
said first means includes
- an endless transmission member resting against predetermined portions of the surface of each of said first and second members.

3. A system according to claim 2, wherein
said second means includes
- a pair of jaws disposed in and guided in longitudinal movement by each of said plurality of channels of each of said first and second members, each jaws of each said pair of jaws being disposed on opposite sides of said transmission member; and
- a pair of threaded rods disposed in each of said plurality of channels of each of said first and second members, each rod of said pairs of rods extending from a different one of said third means of each of said first and second members through that one of said pairs of jaws on the side of said transmission member opposite said different one of said third means and in threaded engagement with said one jaw of each of said pairs of jaws.

4. A system according to claim 3, wherein
said third means includes
- a fixed cam surface disposed adjacent each end of each of said first and second members upon which an associated one of said rods of each of said pairs of rods associated with each of said first and second members ride as each of said first and second members rotate to control in said predetermined manner the time when each of said pairs of jaws of each of said first and second members grip said transmission member.

5. A system according to claim 1, wherein
said second means includes
- a pair of jaws disposed in and guided in longitudinal movement by each of said plurality of channels of each of said first and second members, each jaw of each of said pairs of jaws being disposed on opposite sides of said first means; and
- a pair of threaded rods disposed in each of said plurality of channels of each of said first and second members, each rod of each of said pairs of rods extending from a different one of said third means of each of said first and second members through that one jaw of each of said pairs of jaws on the side of said first means opposite said different one of said third means and in threaded engagement with said one jaw of each of said pairs of jaws.

6. A system according to claim 5, wherein
said third means includes
- a fixed cam surface disposed adjacent each end of each of said first and second members upon which an associated one of said rods of each of said pairs of rods associated with each of said first and second members ride as each of said first and second members rotate to control in said predetermined manner the time when each of said pairs of jaws of each of said first and second members grip said first means.

7. A system according to claim 1, wherein
said third means includes
- a fixed cam surface disposed adjacent each end of each of said first and second members coupled to said second means of each of said first and second members to control in said predetermined manner the time when each of said second means of each of said first and second members grip said first means as said first and second members rotate.

8. A continuously variable transmission system comprising:
- a first conical member capable of rotation only;
- a second conical member capable of rotation only, said second member being oriented with respect to said first member to have its longitudnal axis parallel to the longitudnal axis of said first member, to have its smaller diameter end adjacent the larger diameter end of said first member and to have its larger diameter end adjacent the smaller diameter end of said first member;
- a plurality of predeterminedly spaced longitudnal channels disposed in the surface of each of said first and second members;
- first means encircling and in common to both of said first and second members;
- second means disposed in each of said plurality of channels adjacent said first means capable of gripping said first means to transmit rotation of one of said first and second members to the other of said first and second members;
- third means disposed adjacent each end of both of said first and second members and coupled individually to each of said second means to control in a predetermined manner the time when each of said second means grips said first means to effect transmission of said rotation;
- fourth means coupled to one of said first and second members acting as a drive member to change the longitudnal location of said second means in said plurality of channels of said drive member and, hence, the longitudnal location of said first means on the surface of said drive member; and
- fifth means coupled to the other of said first and second members acting as a driven member and to said second means of said drive and driven members to change the longitudnal location of said second means in said plurality of channels of said driven member and, hence, the longitudnal location of said first means on the surface of said driven member to an appropriate longitudnal position relative to the longitudnal position of said first means on said drive member;
- said fourth and fifth means enabling the achievement of a continuously variable transmission system.

9. A system according to claim 8, wherein
said first means includes
- an endless transmission member resting against predetermined portions of the surface of each of said drive and driven members.

10. A system according to claim 9, wherein
said second means includes
- a pair of jaws disposed in and guided in longitudinal movement by each of said plurality of channels of each of said drive and driven members, each jaw of each of said pairs of jaws being disposed on opposite sides of said transmission member; and
- a pair of threaded rods disposed in each of said plurality of channels of each of said drive and driven members, each rod of each of said pairs of rods extending from a different one of said third means of each of said drive and driven members through that one jaw of each of said pairs of jaws on the side of said transmission member opposite said different one of said third means and in threaded engagement with said one jaw of each of said pairs of jaws.

11. A system according to claim 10, wherein said third means includes
- a fixed cam surface disposed adjacent each end of said drive and driven members upon which an associated one of said rods of each of said pairs of rods associated with each of said drive and driven members ride as each of said drive and driven members rotate to control in said predetermined manner the time when each of said pairs of jaws of each of said drive and driven members grip said transmission members.

12. A system according to claim 11, wherein said fourth means includes
- sixth means disposed adjacent the large diameter end of said drive member coupled to said drive member and that one rod of each of said pairs of rods associated with said one of each of said pairs of jaws of said drive member responsive to rotation of said drive member to selectively rotate each of said one rod to change the longitudinal position of said one of each of said pairs of jaws on the surface of said drive member; and
- seventh means disposed adjacent the smaller diameter end of said drive member coupled to said sixth means and the other rod of each of said pairs of rods associated with the other of each of said pairs of jaws of said drive member responsive to rotation of each of said one rod to rotate the other rod of each of said pairs of rods to change the longitudinal position of the other of each of said pairs of jaws of said drive member on the surface of said drive member in step with the change of said longitudinal position of said one of each of said pairs of jaws of said drive member.

13. A system according to claim 12, wherein said fifth means includes
- eighth means disposed adjacent the large diameter end of said driven member coupled to said driven member and that one rod of each of said pairs of rods associated with said one of said pairs of jaws of said driven member responsive to rotation of said driven member to selectively rotate each of said one rod to change the longitudinal position of said one of each of said pairs of jaws on the surface of said driven member;
- ninth means disposed adjacent the smaller diameter end of said driven member coupled to said eighth means and the other rod of each of said pairs of rods associated with the other of each of said pairs of jaws of said driven member responsive to rotation of each of said one rod to rotate the other rod of each of said pairs of rods to change the longitudinal position of the other of each of said pairs of jaws of said driven member on the surface of said driven member in step with the change of said longitudinal position of said one of each of said pairs of jaws of said driven member; and
- tenth means coupled between said pairs of jaws of said drive member, said pairs of jaws of said driven member and said eighth means to cause the longitudinal position of said pairs of jaws of said driven member to be in step with the change in longitudinal position of said pairs of jaws of said drive member to enable achievement of a continuously variable transmission system.

14. A system according to claim 8, wherein said second means includes
- a pair of jaws disposed in and guided in longitudinal movement by each of said plurality of channels of each of said drive and driven members, each jaw of each of said pairs of jaws being disposed on opposite sides of said first means; and
- a pair of threaded rods disposed in each of said plurality of channels of each of said drive and driven members, each rod of each of said pairs of rods extending from a different one of said third means of each of said drive and driven members through that one jaw of each of said pairs of jaws on the side of said first means opposite said different one of said third means and in threaded engagement with said one jaw of each of said pairs of jaws.

15. A system according to claim 8, wherein said third means includes
- a fixed cam surface disposed adjacent each end of said drive and driven members coupled to said second means of each of said first and second means to control in said predetermined manner the time when each of said second means of each of said drive and driven members grip said first means as said drive and driven members rotate.

16. In a transmission system, a selected one of a drive member and a driven member comprising:
- a conical member capable of rotation only;
- a plurality of predeterminedly spaced longitudnal channels disposed in the surface of said member;
- first means adjacent said surface of said member resting against only a partial portion of said surface of said member;
- second means disposed in each of said plurality of channels adjacent said first means capable of gripping said first means to transmit a selected one of a drive force and a driven force; and
- third means disposed adjacent each end of said member and coupled to said second means to control in a predetermined manner the time when each of said second means grips said first means.

17. In a system according to claim 16, wherein said first means includes
- an endless transmission member resting against predetermined portions of the surface of said conical member.

18. In a system according to claim 16, wherein said second means includes
- a pair of jaws disposed in and guided in longitudinal movement by each of said plurality of channels, each jaw of each of said pairs of jaws being disposed on opposite sides of said first means; and
- a pair of threaded rods disposed in each of said plurality of channels, each rod of each of said pairs of rods extending from a different one of said third means through that one jaw of each of said pair of jaws on the side of said first means opposite said different one of said third means and in threaded engagement with said one jaw of each of said pairs of jaws.

19. In a system according to claim 18, wherein said third means includes
- a fixed cam surface disposed adjacent each end of said conical member upon which an associated one of said rods of each of said pairs of rods ride as said conical member rotates to control in said predetermined manner the time when each of said pairs of jaws grip said first means.

20. In a system according to claim 16, wherein said third means includes
a fixed cam surface disposed adjacent each end of said conical member coupled to said second means to control in said predetermined manner the time when each of said second means grip said first means as said conical member rotates.

* * * * *